Dec. 9, 1924.

C. L. TSENG

VISCOSIMETER

Filed Sept. 12, 1922

Inventor

Charles L. Tseng.

By Lacey & Lacey, Attorneys

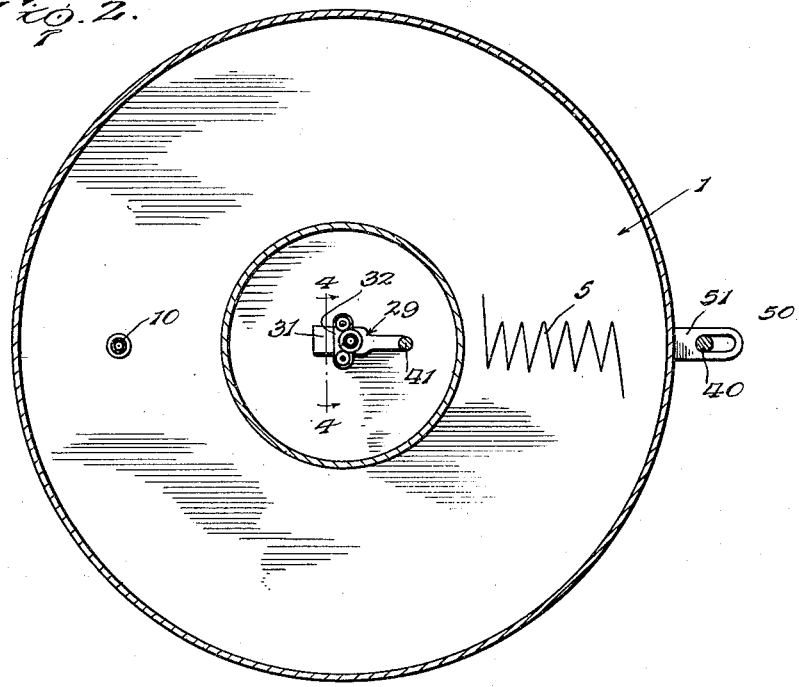
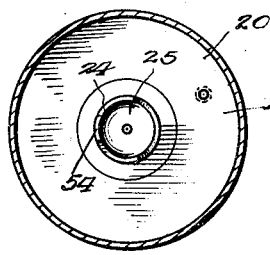
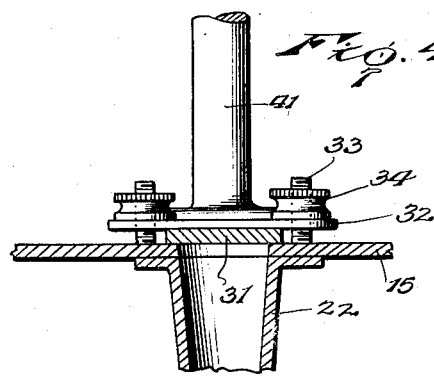

Patented Dec. 9, 1924.

1,518,167

UNITED STATES PATENT OFFICE.

CHARLES L. TSENG, OF CAMBRIDGE, MASSACHUSETTS.

VISCOSIMETER.

Application filed September 12, 1922. Serial No. 587,754.

*To all whom it may concern:*

Be it known that I, CHARLES L. TSENG, a citizen of the Republic of China, residing at Cambridge, in the county of Middlesex and State of Massachusetts, have invented certain new and useful Improvements in Viscosimeters, of which the following is a specification.

This invention relates to improvements in viscosimeters and has as its primary object to provide an apparatus by the use of which the viscosity of liquids may be conveniently and accurately determined in accordance with an established standard, and without the necessity of resorting to the use of calibration curves.

In the accompanying drawings:

Figure 2 is a horizontal sectional view on the line 2—2 of Figure 1;

Figure 3 is a horizontal sectional view on the line 3—3 of Figure 1;

Figure 4 is a detail vertical transverse sectional view substantially on the line 4—4 of Figure 2.

Figure 1:
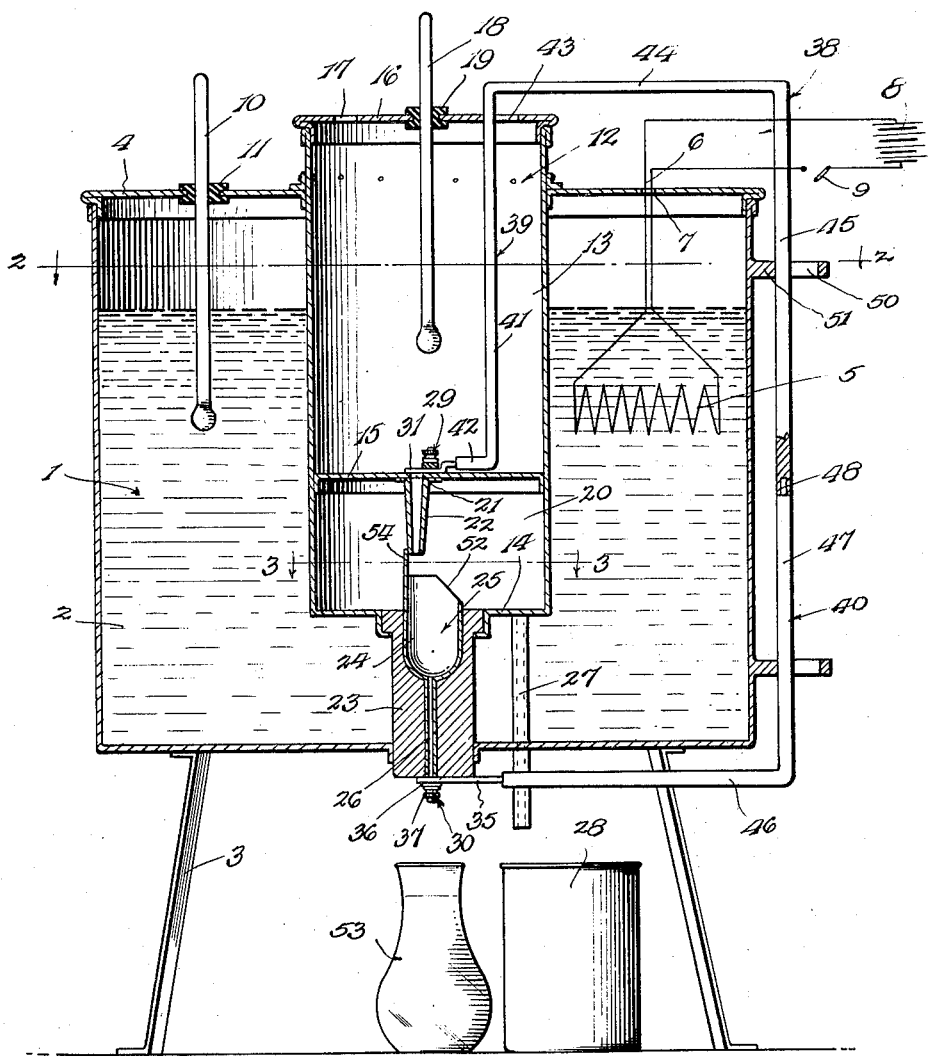
Figure 1 is a vertical sectional view through the viscosimeter embodying the invention.

The apparatus embodying the invention embodies an oil bath which is indicated in general by the numeral 1 and which consists of a vessel 2 of any desired shape and size supported in any suitable manner as, for example, by legs 3, and provided with a removable cover or top 4. The oil within the oil bath is heated through the medium of an electric heater or resistance coil illustrated diagrammatically in Figures 1 and 2 of the drawings, and indicated by the numeral 5, the conductor wires leading to the heater being indicated by the numeral 6 and being led through an opening 7 in the cover 4 of the vessel 2. Current is supplied from any suitable source of power illustrated diagrammatically in Figure 1 and indicated by the numeral 8 and the supply of current may be controlled by any suitable type of switch indicated by the numeral 9. A thermometer 10 is fitted through a gasket 11 in the cover 4 and depends into the oil bath 1 and serves, of course, as a medium for determining the temperature of the bath thereby enabling the attendant of the apparatus to suitably control the supply of current to the heater 5.

The numeral 12 indicates a reservoir which is supported within an opening formed in the cover 4 and which depends into the vessel 2 and has its lower portion submerged in the oil contained in the vessel. This reservoir comprises a preferably cylindrical body 13 having a closed bottom 14, a partition 15 located above its bottom, and a removable cover 16 closing its open top. The cover 16 is provided with a filling opening 17 through which the liquid to be tested may be poured. In order that the temperature of the liquid to be tested may be readily determined a thermometer is fitted through a gasket 19 in the cover 16 of the reservoir 12.

The partition 15 within the reservoir 12 serves to divide the reservoir near its bottom so as to provide an overflow chamber 20, and the said partition 15 is provided with an opening 21 in communication with the upper end of a spout 22 through which the liquid introduced into the reservoir may be delivered under conditions to be presently explained. The numeral 23 indicates a supporting member which is associated with the bottom 14 of the reservoir 12 and with the bottom of the vessel 2 comprising the oil bath 1. Disposed within a seat in the upper portion of the support 23 is the bowl 24 of a pipette 25, the upper portion of the said bowl projecting a suitable distance above the plane of the bottom 14 of the reservoir. The stem of the pipette is indicated by the numeral 26 and extends downwardly through the support 23 and opens through the lower end thereof exterior to the oil bath 1. An overflow pipe 27 leads from the bottom 14 of the reservoir 12 and is consequently in communication with the overflow chamber 20 and to receive the overflow delivered from this pipe any suitable receptacle 28 may be disposed beneath its discharge end, the pipe leading downwardly through the bottom of the vessel 2 as clearly shown in Figure 1.

In order that the flow of the liquid from the reservoir 12 through the spout 22 into the bowl of the pipette 25 may be controlled as also the flow of the liquid from the pipette through the stem 26 thereof, valves indicated in general respectively by the numerals 29 and 30 are provided. The valve 29 comprises a valve plate 31 which is slidably disposed upon the upper side of the partition 15 and in its shifting movement is designed to cover and uncover the opening 21. This valve plate operates beneath a retaining bridge piece 32 which extends transversely above the valve plate and is anchored at its ends upon threaded studs 33 upstanding from the said partition 15, nuts 34 being adjustably threaded on to the stem and bearing upon the opposite ends of the retaining bridge piece 32. The valve 30 comprises a valve plate 35 which is slidably disposed against the lower end of the support 23 and in its shifting adjustment is designed to cover and uncover the lower or discharge end of the stem 26 of the pipette 25. A retaining bridge piece 36 is disposed beneath the valve plate 35 and is retained in place by adjustable nuts 37, this bridge piece corresponding to the bridge piece 32 above described.

The actuating means for the valve plates is manually operable and is intended to simultaneously and correspondingly actuate or adjust the said plates, and it comprises a frame indicated in general by the numeral 38 as best shown in Figure 1 of the drawings. The frame 38 comprises two members, one indicated by the numeral 39 and associated with the valve 29, and the other indicated by the numeral 40 and associated with the valve 30. The member 39 comprises a vertically disposed portion 41 which is provided with a laterally turned lower end 42 supporting the valve plate 31, the said portion 41 extending vertically within the reservoir 12 and slidably through a slot 43 formed in the cover 16 of the said reservoir. The frame member 39 further includes a portion 44 which extends at right angles laterally from the upper portion 41, and a portion 45 which extends downwardly at right angles from the outer end of the portion 44. The member 40 of the frame comprises a horizontally disposed portion 46 extending beneath the bottom of the vessel 2 and supporting at its inner end the valve plate 35. This member further includes a portion 47 which extends vertically at right angles from the outer end of the portion 46, and the upper end of this portion 47 and the lower end of the portion 45 are separably connected by a stud and socket joint 48. The portions 45 and 47 of the members 39 and 40, respectively, operate slidably in slots 50 formed in guides 51 which outstand from the side of the vessel 2.

For a purpose to be presently explained it is expedient to cut away the upper portion of the bowl 24 of the pipette 25 at an angle throughout substantially one-half the circumference of the bowl as indicated by the numeral 52.

The numeral 53 indicates a flask which is employed in connection with the viscosimeter.

It will be understood that the reservoir 12 may be bodily removed from its position within the opening in the cover 4, together with all parts associated therewith.

In the use of the apparatus, the reservoir 12 is filled with the liquid to be tested and the oil bath is brought to the required degree of temperature. The flask 53 being in position beneath the valve 30, the valve actuating means 38 is moved to the right in Figure 1 so as to shift both of the valve plates 31 and 35 to position uncovering the opening 21 and the discharge end of the pipette stem 26, respectively. The spout 22 is of greater diameter than the stem 26 and therefore the flow of liquid through the spout will be at a greater rate than from the pipette through the said stem 26. When the valves are opened as stated, the pipette 25 will be filled, and when it is full the valve actuating means 38 is shifted to the left to occupy the position shown in Figure 1 thus closing both of the valves 29 and 30 and cutting off the flow of liquid to the pipette 25 as well as from the pipette to the flask. The flask is now emptied and again placed in position, and the actuating means 38 is again shifted to the right so as to open both of the valves. At this time note is made of the elapsed time required to fill the graduated flask 53, and when the flask has been filled to the predetermined graduated mark, the valves are again closed, and from the time readings taken, the viscosity of the liquid being tested may be immediately determined with accuracy, a standard having been previously established by carrying out the method above outlined in the use of a liquid of a known degree of viscosity.

In order to prevent undue agitation or disturbance of the liquid within the pipette 25 by the delivery of liquid through the nozzle 22, it is preferable that the bowl of the pipette be provided at one side with an upward extension 54 which contacts the discharge end of the said spout and conducts the liquid in an even flowing stream into the bowl of the said pipette.

It will be evident that due to the cutting away of the bowl of the pipette at an angle, and the provision of the overflow 27, a constant head of liquid is maintained in the bowl of the pipette.

Having thus described the invention, what is claimed as new is:

1. A viscosimeter comprising a reservoir having a discharge opening therein, a pipette arranged to receive liquid discharged from the reservoir, valves controlling the flow of liquid from the reservoir to the pipette and from the pipette, and means operable to simultaneously actuate the valves.

2. A viscosimeter comprising a reservoir having an outlet spout leading from its bottom, a pipette arranged to receive liquid discharged from the said reservoir through the spout, said pipette comprising a bowl and a discharge stem, a valve controlling the flow of liquid from the reservoir through the spout, a valve controlling the flow of liquid from the pipette stem, and means operable to simultaneously actuate the valves.

3. A viscosimeter comprising a reservoir, having an overflow chamber, a pipette having a bowl opening into said chamber and provided with a discharge stem, a spout leading from the reservoir and in communication with the overflow chamber and arranged to discharge into the bowl of the pipette, and means operable to simultaneously control the flow of liquid through the spout and from the stem of the pipette.

4. A viscosimeter comprising a reservoir having an overflow chamber, means for subjecting the reservoir to heat, a pipette having a bowl supported within the overflow chamber and in communication therewith and provided with a discharge stem, a spout leading from the reservoir and in communication with said chamber and arranged to discharge into the bowl of the pipette, the said overflow chamber and pipette being likewise subjected to the heating means provided in connection with the reservoir, and means for controlling the flow of liquid from the reservoir to the pipette and from the said pipette.

In testimony whereof I affix my signature.

CHARLES L. TSENG. [L. S.]